June 7, 1932. G. E. GARNO 1,862,216

CHUCK

Original Filed Dec. 27, 1926

Inventor

George E. Garno

By Geo. H. Kennedy Jr.

Attorney

Patented June 7, 1932

1,862,216

UNITED STATES PATENT OFFICE

GEORGE E. GARNO, OF WORCESTER, MASSACHUSETTS, ASSIGNOR TO THE HEALD MACHINE COMPANY, OF WORCESTER, MASSACHUSETTS, A CORPORATION OF MASSACHUSETTS

CHUCK

Original application filed December 27, 1926, Serial No. 157,175. Patent No. 1,783,420. Divided and this application filed January 27, 1930. Serial No. 423,728.

The invention relates to chucks of the collet type and provides an improved means for actuating the jaws, whereby their gripping surfaces will be always parallel to (or more strictly will contain lines parallel to) the axis of the chuck. The present application is a division from my prior and copending application Serial No. 157,175, filed December 27, 1926, now Patent Number 1,783,420, granted Dec. 2, 1930.

In the standard type of collet chuck the jaws are made integral with a ring, and when the ring is drawn into the chuck, the jaws are forced together by a conical hood or other encircling body. In case the work varies by even a small amount from the size for which the particular jaws have been ground, the jaws will contact the work at an angle, and hold the workpiece with only a point or a line contact.

According to the present invention, the jaws are not rigid with the member to which the chuck draw bar is attached, but are pivotally connected thereto. In the modification illustrated in the present application and claimed herein this connection is made by two pivot pins and a link. Thus the jaws will always grip the workpiece solidly, and not by point or line contact.

Another feature of the invention resides in the provision of interchangeable jaw pieces, all of which will fit the same set of jaws. The above and further advantageous features of the invention will hereinafter more fully appear, reference being had to the accompanying drawing, in which—

Like reference characters refer to like parts in the different figures.

Figure 2:
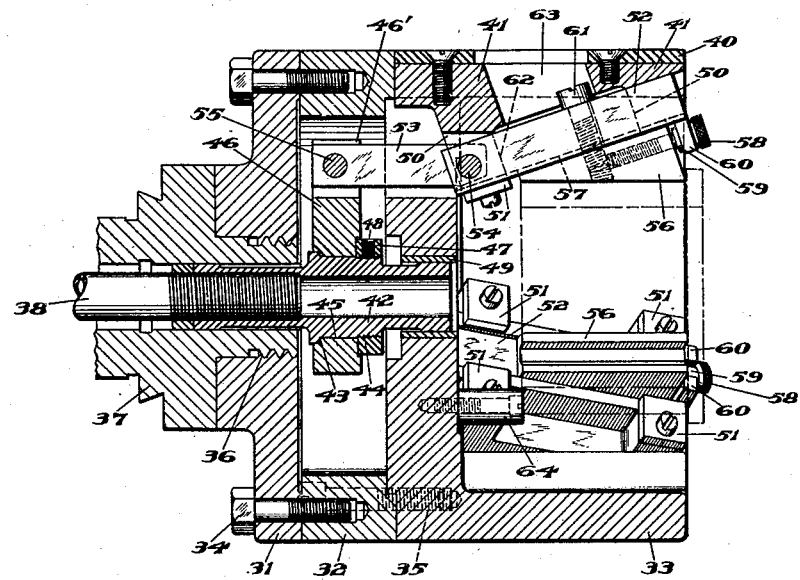
Fig. 2 is a vertical sectional view taken on the line 2—2 of Fig. 1.

Referring to both figures, the casing of the chuck comprises a plate 31, a hollow cylindrical member 32, and a generally cup shaped member 33. The plate 31 is attached to the hollow cylindrical member 32 by bolts 34, while the hollow member 32 is in turn attached to the member 33 by the screws 35.

The plate 31 has a threaded bore 36 by means of which it is attached to the threaded front end of a work rotating shaft or spindle 37. Said spindle is hollow for the reception of a chuck actuating rod or draw bar 38, by the longitudinal movement of which the chuck is opened or closed.

Figure 1:
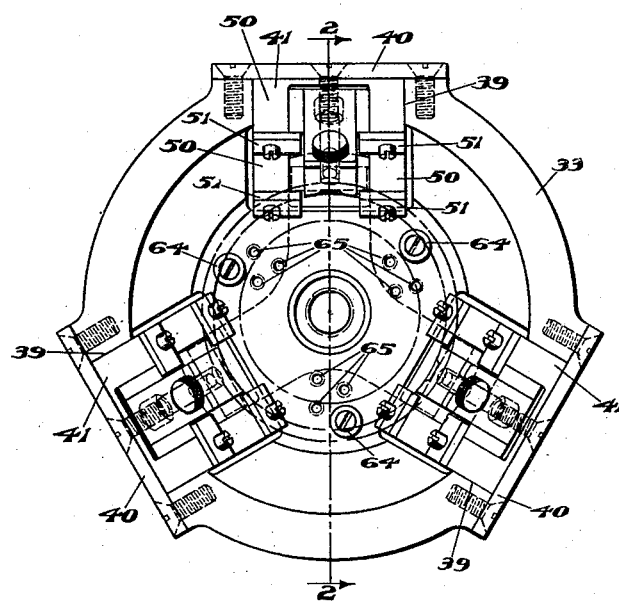
Fig. 1 is a front view of a chuck or work holding device constructed in accordance with the invention.

The chuck member 33 is slotted at 39, 39, 39 (Fig. 1), said slots being desirably equally spaced around the circle, that is to say, 120° apart. The slots 39 are bridged by plates 40, 40, 40, which are fastened, by countersunk screws, to the outside surface of the member 33. Detachably fastened to the plates 40 are wedge members 41, 41, 41.

The front end of the rod 38 is screw threaded and has attached thereto a sleeve 42. The sleeve 42 provides a shoulder 43 and a short screw threaded portion 44, the latter being spaced from the shoulder 43 by a cylindrical surface 45. A three armed member 46 fits over the surface 45 and is held in place on the sleeve by a nut 47 which fits on the threaded portion 44, the nut 47 being desirably provided with a locking screw 48. The front end of the sleeve 42 is slidably received by a bushing 49 in the chuck member 33.

The wedge members 41 each have four inwardly extending projections 50, each of said projections being provided with plates 51. Plates 51 extend over the sides of the projections toward each other and form, together with the interior surface of the wedge members 41, guideways for three members 52, which are substantially rectangular parallelopipeds. The members 52 are each connected to ears 46' formed on the three armed member 46, the connections being made by links 53. The links 53 connect to the members 52 by means of pivot pins 54, and to the ears 46' by means of pins 55. The ends of members 52 are forked to receive the links.

When the rod 38 is moved to the right, Fig. 2, the chuck is opened, because the member 46, being in its farthest front position, the jaw holding members 52 are at those ends of the guideways formed by the wedge members 41 and the plates 51 that are farthest apart. Conversely, movement of the draw bar to the left moves the members back in the inclined guideways. A comparatively long jaw piece 56 is attached to each member 52, and the chuck is therefore particularly adapted for relatively long workpieces. It must be understood, however, that the chuck is not thus limited in use, and a smaller jaw piece may be used within the contemplation of the invention.

The jaw pieces 56 fit in grooves 57, best shown in dotted lines in Fig. 2, on the inward side of members 52. They may be adjusted longitudinally in said grooves by thumb screws 58, which are provided with collar portions 59. U-shaped guide pieces 60, attached to and extending inwardly from the members 52, surround the collars 59 and thus hold the screws 58 in position relative to said members. It will be seen that by turning the screws 58, the jaw pieces 56 can be adjusted inwardly or outwardly of the chuck, and as they are moved inwardly, they will approach, because of the inclined position of members 52. When the jaw pieces 56 have been properly adjusted for a given size of workpiece, they are firmly clamped in position on the members 52 by screws 61, the heads of which project above long slots 62 formed in members 52. For the purpose of getting at these screws 61, the members 41 likewise provide long slots 63 just above the slots 62.

The chuck is provided with removable backing plugs 64 which are adapted to limit the inward movement of a workpiece. These plugs 64 may be located in any of a set of holes 65 which are provided in the member 33, in order that the plugs may be located in different positions for different sizes of workpieces. It will be understood that the draw bar or rod 38 is held to the left to cause the chuck to clamp the workpiece by a powerful spring, not shown, such as is ordinarily used in connection with draw bar chucks.

In the appended claims, the jaw members 56 and the parallelopipedal members 52 will be treated as a single operative element unless the claim itself specifies otherwise.

I claim:

1. In a chuck, a plurality of slidably mounted jaw holding members, a plurality of jaws slidably mounted on said members, and means to adjust said jaws on said members and means to lock them in place thereon.

2. In a chuck, a plurality of slidably mounted jaw holding members, a plurality of jaws slidably mounted on said members, and screws to lock said jaws against movement on said members, although permitting sliding movement of the jaw holding members.

3. In a chuck, a member mounted for axial movement therein, a set of work gripping jaws mounted for sliding movement in said chuck, cooperating inclined plane surfaces on said chucks and said jaws, means to confine the jaws, to maintain the plane surfaces on said jaws positively in engagement with the plane surfaces on the chuck to cause said jaws to move in a straight line, links pivotally connected to said member mounted for axial movement and to said jaws, in order to draw said jaws inwardly of said chuck by movement of said member, the links allowing elements of said jaws to remain in parallel relation to each other and to the elements of the surface of a workpiece.

4. In a chuck, a member slidably mounted in said chuck, jaw members having opposite parallel surfaces, inclined guideways positively confining said jaw members and allowing them to move only in a single line, and links connecting said first named slidable member to said jaw members, whereby to allow elements of the work holding jaws to remain parallel as the jaws are closed by the drawing of said slidable member which through the links, produces movement of the jaw members in the guides.

GEORGE E. GARNO.